United States Patent
Kay (10) Patent No.: US 9,091,523 B2
(45) Date of Patent: Jul. 28, 2015

(54) PROFILOMETER WITH PARTIAL COHERENCE INTERFEROMETER ADAPTED FOR AVOIDING MEASUREMENTS STRADDLING A NULL POSITION

(71) Applicant: Quality Vision International, Inc., Rochester, NY (US)

(72) Inventor: David B. Kay, Rochester, NY (US)

(73) Assignee: Quality Vision International, Inc., Rochester, NY (US)

( * ) Notice: Subject to any disclaimer, the term of this patent is extended or adjusted under 35 U.S.C. 154(b) by 99 days.

(21) Appl. No.: 13/946,673

(22) Filed: Jul. 19, 2013

(65) Prior Publication Data

US 2015/0022817 A1    Jan. 22, 2015

(51) Int. Cl.
*G01B 9/02*    (2006.01)

(52) U.S. Cl.
CPC ........ *G01B 9/02091* (2013.01); *G01B 9/02044* (2013.01); *G01B 9/02071* (2013.01); *G01B 9/0209* (2013.01)

(58) Field of Classification Search
CPC ........... G01B 9/02091; G01B 9/02044; G01B 9/02078; G01B 9/02084; G01B 9/0209; G01B 9/02007; G01B 9/02064; G01B 9/02057; G01B 9/02063; G01B 9/02071
See application file for complete search history.

(56) References Cited

U.S. PATENT DOCUMENTS

| | | | | |
|---|---|---|---|---|
| 3,825,347 A | * | 7/1974 | Kaiser | 356/451 |
| 5,412,474 A | * | 5/1995 | Reasenberg et al. | 356/486 |
| 5,774,213 A | * | 6/1998 | Trebino et al. | 356/320 |
| 6,377,349 B1 | | 4/2002 | Fercher | |
| 6,862,535 B2 | * | 3/2005 | Binder | 702/24 |
| 7,433,046 B2 | | 10/2008 | Everett et al. | |
| 7,791,731 B2 | | 9/2010 | Kay | |
| 2005/0018201 A1 | * | 1/2005 | de Boer et al. | 356/479 |
| 2006/0098207 A1 | * | 5/2006 | Koch et al. | 356/504 |

(Continued)

OTHER PUBLICATIONS

Kowalczyk et al.: "Full range complex spectral optical coherence tomography technique in eye imaging," Aug. 15, 2002, vol. 27, No. 16, Optics Letters, pp. 1415-1417.

(Continued)

*Primary Examiner* — Kara E Geisel
*Assistant Examiner* — Maurice Smith
(74) *Attorney, Agent, or Firm* — Thomas B. Ryan, Patent Agent; Harter Secrest & Emery LLP (57) ABSTRACT

A profilometer incorporating a partial coherence interferometer directs a beam containing a band of wavelengths along object and reference arms of the interferometer into respective engagements with a test object surface and a reference object surface en route to a spectrometer for measuring a spectrum of the beam. Within the object arm, the test object surface is relatively moved through a range of positions offset from a null position at which optical path lengths of the object and reference arms are equal. Modulation frequencies of the beam spectrum are calculated at a succession of different focus spot positions across the test object surface. Changes in the modulation frequency are interpreted to distinguish between optical path length differences at which the optical path length of the object arm is longer or shorter than the optical path length of the reference arm.

25 Claims, 5 Drawing Sheets

(56) References Cited

U.S. PATENT DOCUMENTS

| | | |
|---|---|---|
| 2007/0165234 A1 | 7/2007 | Podoleanu |
| 2008/0065350 A1 | 3/2008 | de Groot et al. |
| 2009/0153839 A1* | 6/2009 | Kay ............................... 356/51 |
| 2010/0046003 A1 | 2/2010 | Le Floch et al. |

OTHER PUBLICATIONS de Groot et al.: "Laser gage using chirped synthetic wavelength interferometry," Society of Photo-Optical Inistrumentation Engineers © 1993 (10 pages).

* cited by examiner

PROFILOMETER WITH PARTIAL COHERENCE INTERFEROMETER ADAPTED FOR AVOIDING MEASUREMENTS STRADDLING A NULL POSITION

TECHNICAL FIELD

The invention relates to measuring systems, including profilometers, particularly of a type incorporating partial coherence interferometers, and to the avoidance of interferometric measurements straddling a null position.

BACKGROUND OF THE INVENTION

Optical profilometers include optical probes for taking point-by-point measurements across a test object. The probes typically include a focusing optic to focus light onto a small spot on a test object. The same focusing optic can be used to collect light reflected from the focus spots for purposes of measurement.

Partial coherence interferometers can be used with optical profilometers to interpret depth changes in the focus spot as changes in the surface height of test objects. The light sources of partial coherence interferometers typically produce spatially coherent beams encompassing a band of wavelengths. Object and reference arms of the interferometer convey different portions of the beam into respective engagements with a test object and a reference object en route to a spectrometer. The optical path length of the object arm, which includes the optical probe, is subject to change with the changes in the surface height of the test object.

The spectrometer separates the interfering beams returning from the test and reference objects into spectral components. The interference phase of each spectral component progressively varies across the band of wavelengths. That is, the modulo $2\pi$ number of wavelengths spanning a given optical path length difference between the object and reference arms of the interferometer varies with the wavelength. The rate of change in phase as a function of the change in wavelength, which is referred to as a modulation frequency, is known to be proportional to the optical path length difference. Thus, variations in the surface height of the test object, which change the optical path length of the object arm, can be measured by monitoring variations in the modulation frequency. Increases in the optical path length difference between the object and reference arms are associated with increases in the modulation frequency, which is caused by the multiplication of small differences between adjacent wavelengths by the number of wavelengths spanning the increased distance.

A so-called "null position" exists where the optical path length difference between the object and reference arms is zero. Here, the modulation frequency is also zero, a characteristic exploited by white light interferometers. Equal optical path length differences on either side of the null condition, i.e., where the optical path length of the object arm is either longer than or shorter than the optical path length of the reference arm, produce the same modulation frequencies.

To avoid such ambiguity, partial coherence interferometers can be used with other measuring instruments to either distinguish between measurements taken on opposite sides of the null position or to limit the range of measurement to just one side of the null position. The additional instrumentation adds cost and complexity and can be difficult to implement over the intended range of measurement with the desired accuracy.

SUMMARY OF THE INVENTION

The invention further exploits the capabilities of partial coherence interferometers at essentially two different interferometer configurations to resolve the ambiguity between measurements taken on opposite sides of the null position. The configuration of the interferometer is changed by deliberately altering the optical path length difference between the object and reference arms and by monitoring the related change in modulation frequency. The direction of the change in modulation frequency in response to the known alteration of the optical path length difference can be interpreted to resolve the measurement position to a particular side of the null position. Beyond the modifications to the interferometer itself to effect the deliberate alteration in the optical path length difference, no additional measuring instruments are required to resolve the ambiguity.

One version of the invention as an optical profilometer includes a light source for emitting a beam composed of a band of wavelengths, a spectrometer for measuring the spectrum of the beam, and an interferometer having object and reference arms along which object and reference portions of the beam from the light source are propagated into respective engagements with a test object surface and a reference surface en route to the spectrometer. For collecting individual measurements of the test object surface, a focusing optic focuses the object portion of the beam onto a focus spot on the test object surface. The test object is typically mounted to an x-y translation stage and translated beneath the focused spot that is offset from a null position at which optical path lengths of the object and reference arms are equal. Alternatively, the focus spot could be translated or otherwise moved with respect to the test object. A processor in communication with the spectrometer calculates a modulation frequency of the beam spectrum for measuring optical path length differences between the object and reference arms at a succession of different focus spot positions across the test object surface. The object beam focus is preferably tracked at the object surface through feedback to a z-axis translator upon which a profilometer head is mounted. Alternatively, the test object could be mounted on a z-axis translator. However, a sudden height shift could occur that cannot be tracked and the measurement could be taken on the wrong side of null. To monitor for measurement positions that may have shifted to an opposite side of the null position, an optical path length adjuster provides for relatively shifting the optical path length of the reference arm with respect to the optical path length of the object arm at particular focus spot positions on the test object surface by an amount that exceeds the expected range of test object surface variation between adjacent focus spot positions. The processor monitors changes in the modulation frequency associated with the relative shifts in optical path lengths imparted by the adjuster to detect changes in the position of the focus spot on the test object surface from one side of the null position to the other.

For example, the processor can be arranged to interpret a monitored decrease in the modulation frequency associated with the relative shift in the optical path length of the reference arm with respect to the optical path length of the object arm as a position on one side of the null position and a monitored increase in the modulation frequency associated with the relative shift in the optical path length of the reference arm with respect to the optical path length of the object arm as a position on the other side of the null position. In addition, the processor preferably relates the calculated modulation frequencies at the succession of different focus spot positions with variations in the height of points on the test object surface and in doing so preferably adjusts the related height of the points in accordance with the relative shifts in optical path lengths effected by the adjuster. The actuator can be arranged to restore the position of the subsequent focus spots on the test object surface from the other side to the one side of the null position in response to the detection of a change in the position of a particular focus spot position from the one side of the null position to the other.

The adjuster can be used to establish a first optical path length difference setting at which the focus spot is relatively moved across the test object surface and to relatively shift the optical path length difference to a second setting at the particular focus spot positions on the test object surface to detect changes in the relative position of the focus spot positions from one side of the null position to the other.

The adjuster can restore the first setting or maintain the second setting. For example, the adjuster can restore the first setting for subsequent focus spot positions on the test object surface to maintain a common frame of reference. Alternatively, the adjuster can maintain the second setting for more than one subsequent focus spot positions on the test object surface before restoring the first setting, and the processor can be arranged to monitor changes in the calculated modulation frequency associated with the relative shift in optical path length imparted by the adjuster from the second setting to the first setting to detect changes in the position of the focus spots on the test object surface from one side of the null position to the other. Any shift between settings of the adjuster can be used to monitor for changes in the focus spot positions between opposite sides of the null position. Particularly if a comparison is to be made between modulation frequencies at two different settings of the adjuster associated with different focal spot positions, the adjuster is preferably controlled to relatively change the optical path length of the reference arm with respect to an optical path length of the object arm by an amount that is beyond the expected range of optical path length differences associated with height variations in the test object surface.

While the adjuster can be located in either the object arm or the reference arm, adjustments to the reference arm are generally preferred. The adjuster can be arranged to relatively shift the reference surface with respect to the test object surface or to relatively change a refractive index within the reference arm.

Another version of the invention as a partial coherence interferometer for resolving signed spectral modulation frequency ambiguities of measured points includes a spectrometer for measuring the spectral content of a beam containing a band of wavelengths centered about a nominal wavelength and object and reference arms for conveying different portions of the beam into respective engagements with a test object and a reference object en route to the spectrometer. An optical path length adjuster relatively changes an optical path length of the reference arm with respect to an optical path length of the object arm by an amount that significantly exceeds the nominal wavelength of the band (i.e., by a multiple of the nominal wavelength). A processor in communication with the spectrometer determines modulation frequencies of the beam over the band of wavelengths and interprets changes in the modulation frequency in response to the relative change in optical path length imparted by the adjuster to distinguish between optical path length differences at which the optical path length of the object arm is longer or shorter than the optical path length of the reference arm.

Preferably, the spectrometer provides for recording the interference effects over the band of wavelengths between beam portions traversing the object and reference arms, and the processor calculates modulation frequencies imparted by the interference effects that are proportional to the absolute optical path length difference between the object and reference arms. In addition, the processor preferably interprets decreases in the modulation frequency in response to the relative change in optical path length imparted by the adjuster as an indication that a measurement was taken at one side of a null position and increases in the modulation frequency in response to the relative change in optical path length imparted by the adjuster as an indication that a measurement was taken at the other side of the null position.

Another version of the invention as method of monitoring shifts in measurement positions of a partial coherence interferometer between opposite sides of a null measurement position includes directing a beam containing a band of wavelengths centered about a nominal wavelength along object and reference arms of the interferometer for conveying different object and reference portions of the beam into respective engagements with a test object surface and a reference object surface en route to a spectrometer for measuring a spectrum of the beam. For taking measurements with an optical probe, the object portion of the beam is focused onto a spot on the test object surface. The focus spot is relatively moved across the test object surface through a range of positions offset from a null position at which optical path lengths of the object and reference arms are equal. A modulation frequency of the beam spectrum is calculated for measuring optical path length differences between the object and reference arms at a succession of different focus spot positions across the test object surface. The optical path length of the reference arm is relatively changed with respect to the optical path length of the object arm at particular focus spot positions on the test object surface by an amount that significantly exceeds the nominal wavelength of the band. Changes in the modulation frequency in response to the relative change in optical path length are interpreted to distinguish between optical path length differences at which the optical path length of the object arm is longer or shorter than the optical path length of the reference arm.

Preferably, a decrease in the modulation frequency in response to the relative change in optical path length is interpreted as an indication that a measurement was taken at one side of a null position and an increase in the modulation frequency in response to the relative change in optical path length is interpreted as an indication that a measurement was taken at the other side of the null position.

A first optical path length difference setting at which the focus spot is relatively moved across the test object surface can be established between the object and reference beams and the optical path length difference setting at the particular focus spot positions on the test object surface can be changed to detect changes in the relative position of the particular focus spot positions from one side of the null position to the other. Preferably, the optical path length of the reference arm is changed with respect to an optical path length of the object arm to restore the focus spot position from the other side to the one side of the null position.

DETAILED DESCRIPTION OF THE INVENTION

Figure 1:
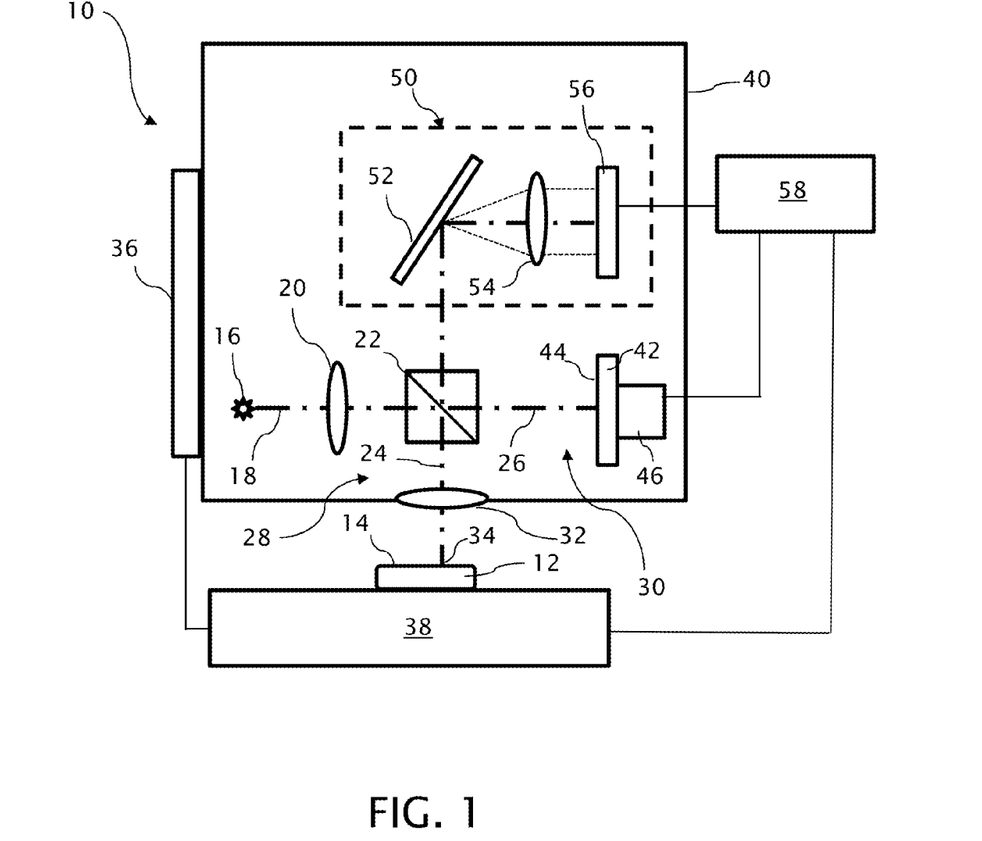
FIG. 1 is a diagram depicting an optical profilometer incorporating a partial coherence interferometer in accordance with the invention.

An optical profilometer 10 incorporating a partial coherence interferometer is shown in FIG. 1 in a configuration for measuring a surface 14 of a test object 12. A light source 16 of the profilometer 10 emits a measuring beam 18 having a given spectral bandwidth, preferably within the visible or infrared spectrum. The light source 16 is preferably a broadband light source 16, such as a superluminescent diode, having power output of approximately 5 milliwatts and a spectral bandwidth of approximately 40 nanometers of wavelength or more at a nominal wavelength of approximately 800 nanometers. As such, the light source 16 can also be referred to as a low temporal coherence source. However, the light source 16 preferably retains spatial coherence so that the measuring beam 18 can be focused to a small spot size for taking individual measurements on the test object surface 14.

A collector/collimating optic 20 collects light from the light source 16 for further propagating the measuring beam 18 as a collimated beam. A beamsplitter 22 divides the collimated measuring beam 18 into an object beam 24 and a reference beam 26. The object beam 24 reflects from beamsplitter 22 for propagating along an object arm 28 of the interferometer. The reference beam 26 transmits through the beamsplitter 22 for propagating along a reference arm 30 of the interferometer.

A focusing optic 32 converges the object beam 24 toward a point of focus on or at least near the test object surface 14 for forming a focus spot 34 on the test object surface 14. The same focusing optic 32 collects light reflected by specular, diffuse, or some combination of specular and diffuse reflection from the test object surface 14 for directing the object beam 24 on a return path back to the beamsplitter 22. Preferably, the focusing optic 32 has a numerical aperture of approximately 0.1, resulting in a measurement range of around 1.0 millimeter.

The test object 12 is mounted on a multi-axis stage 38 for translating the test object 12 along one or more axes of motion with respect to the object arm 28 for moving the focus spot 34 across the test object surface 14. A profilometer head 40 is mounted on a z-axis actuator 36 for adjusting the axial spacing between the focusing optic 32 and the test object 12 so that the focus of the focusing optic 32 is on or very near the test object surface 14. A similar adjustment can be made by axially translating the test object 12. The multi-axis stage 38 can also be arranged to provide for rotating the test object 12 about one or more rotational axes for changing the orientation of the test object 12, e.g., to an orientation at which the object beam 24 remains approximately normal to the test object surface 14, or to move the focus spot 34 across the test object surface 14. Of course, the relative motion between the object beam 24 and the test object surface 14 can be effected by relatively moving either or both of the object beam 24 and the test object 12.

The reference beam 26 is incident upon a surface 44 of a reference object 42, such as a plane mirror or preferably a corner cube, and is returned to the beamsplitter 22 in a collimated form. The reference object 42 is mounted on an adjuster 46 for lengthening or shortening the optical path length of the reference arm 30. For example, the adjuster 46 can be piezoelectric driver, such as a PZT (piezoelectric transducer, lead zirconate titanate) that physically changes shape when an external electric field is applied. The axial displacement of the reference surface 44 has the effect of changing the optical path length of the reference arm 30 by twice the amount of the displacement because of the propagation of the reference beam 26 to and from the reference surface 44.

At least portions of the reflected object and reference beams 24 and 26 are recombined by the beamsplitter 22 for propagation together to a spectrometer 50, i.e., a spectrally sensitive detector system. That is, the beamsplitter 22 transmits at least a portion of the returning object beam 24 and reflects at least a portion of the returning reference beam 26 in a common direction toward the spectrometer 50. Although the spectrometer 50 can take a variety of known forms, the depicted spectrometer 50 combines a diffraction grating 52 for angularly separating the different wavelengths of the recombined object and reference beams 24 and 26 with a focusing optic 54 for focusing the angularly separated wavelengths at different positions along a detector 56, such as a linear CCD (charge coupled device) sensor array. The detector 56 measures the respective intensities of the spatially separated wavelengths that are modulated by interference between the recombined object and reference beams 24 and 26.

The interference phase of each wavelength within a cycle of constructive and destructive interference is determined by a modulo $2\pi$ function of the optical path length difference (OPD) between the object and reference arms 28 and 30 divided by the wavelength. The rate of change in phase from one wavelength to another, as a change in phase divided by the change in wavelength, is referred to as a modulation frequency, which is known to be proportional to the optical path length difference (OPD).

The detector 56 records the intensities of the different wavelengths, and the intensities which modulate as a function of the interference phase can be interpreted by further processing to determine the modulation frequency. While accounting where necessary for other influences on intensity, such as the initial distribution of intensity within the measuring beam 18, a Fourier transform can be used to convert the modulation in intensity with respect to wavelength as a modulation frequency proportional to the optical path length difference (OPD). Height variations in the test object surface 14 are equal to one-half of the variation in optical path length difference (OPD).

The measured optical path length difference (OPD) is an unsigned value because the intensity patterns associated with equal optical path length differences (OPDs), where the object arm 28 has an optical path length that is longer than or shorter than the optical path length of the reference arm 30, exhibit the same modulation frequencies. Thus, measurement positions at equal distances from a null position at which the optical path length difference (OPD) is zero, i.e., the optical path lengths of the object and reference arms 28 and 30 are the same, are indistinguishable by their resulting modulation frequencies alone.

The ambiguity between the two measurement positions associated with each modulation frequency can exist at the initial setup of the profilometer 10 or between successive measurements at different points on the test object surface 14. To resolve this ambiguity, the adjuster 46 changes the optical path length of the reference arm 30 by a predetermined amount and the modulation frequency at the shifted position is compared to the modulation frequency just prior to the shift. Since the direction of the change is known, i.e., as either an increase or decrease in the optical path length of the reference arm 30, the modulation frequency can be expected to shift in one direction when the measurement position is on one side of null and in the opposite direction when the measurement position is on the other side of null. For example, if the reference arm is shortened, and the modulation frequency increases as a result of the change, the measurement position is located on the far side of the null position, i.e., the object arm 28 is longer than the reference arm 30. Similarly, if the reference arm is shortened and the modulation frequency decreases as a result of the change, the measurement position is located on the near side of the null position, i.e., the object arm 28 is shorter than the reference arm 30.

If modulation frequency comparisons are to be made between successively measured points on the test object surface 14, the change in optical path length effected by the adjuster 46 should be greater than the expected height variation between successively measured points. Otherwise, a directional change in the modulation frequency could be erroneously attributed to the change in surface height rather than the imposed change in the optical path length difference setting effected by the adjuster 46. In addition, the change in modulation frequency should be clearly resolvable, which in most instances requires an optical path length shift by more than the nominal wavelength of the measuring beam and is generally more than two times the nominal wavelength and in the profilometer case preferably more than 30 times the nominal wavelength.

Figure 2:
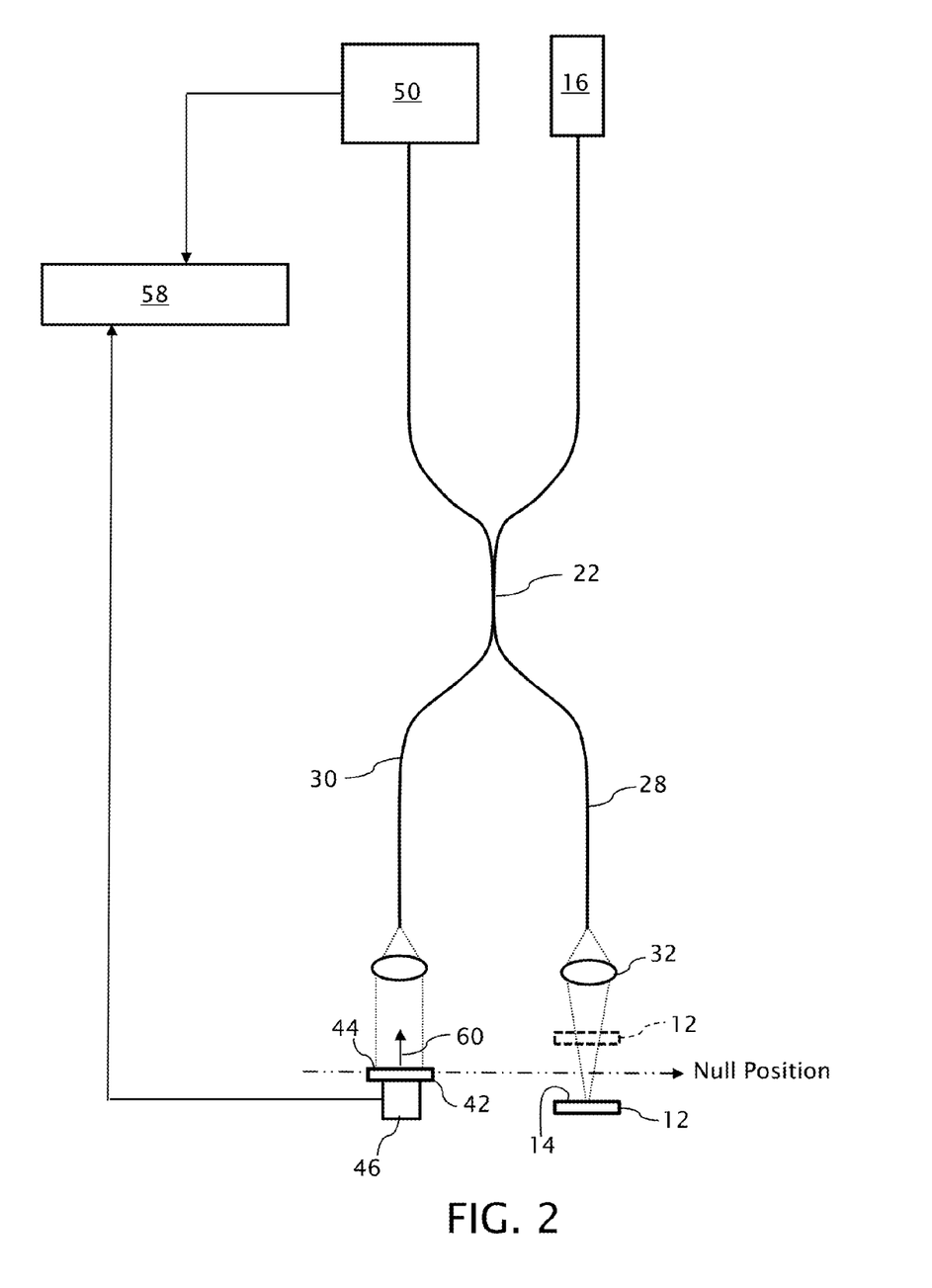
FIG. 2 is a diagram depicting a fiber optic version of a partial coherence interferometer in accordance with the invention.

FIG. 2 provides an illustration of the inventive concept in which the partial coherence interferometer is depicted in fiber optics but corresponding components share the same reference numerals. In the position shown, the test object 12 and more particularly the test object surface 14 as shown in solid lines is located on the far side of the null position, where the null position is defined as an optical path length of the object arm 28 equal to the optical path length of the reference arm 30. Thus, in the position shown, the optical path length of the object arm 28 is longer than the optical path length of the reference arm 20.

Figure 3A:
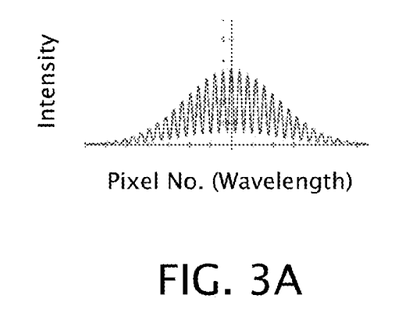
FIGS. 3A-3C are graphs depicting spectral profiles captured by a spectrometer of the partial coherence interferometer showing changes in the profiles effected by an optical path length adjuster for measurement positions on opposite sides of a null position.
Figure 3B:
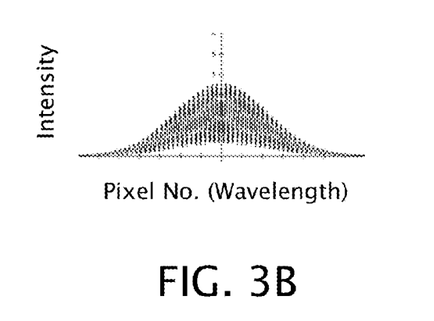
Figure 4A:
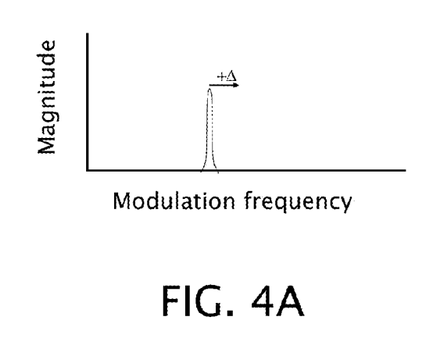
FIG. 4A-4B are graphs depicting shifts in modulation frequency effected by the adjuster for the measurement positions on opposite sides of a null position.

FIG. 3A depicts a modulation in intensity as might be recorded at the spectrometer 50 (i.e., intensity over a domain of wavelengths) at the given offset of the test object surface 14 from the initial null position. The overall envelope of the modulation intensity corresponds to the distribution of energy over the bandwidth of the light source 12. FIG. 3B depicts a modulation in intensity at a higher frequency as would be recorded at the spectrometer 50 after a shift of the reference object 42 effected by the adjuster 46 in the direction of arrow 60 for shortening the optical path length of the reference arm 30. The shift moves the instant null position farther from the test object surface 14 so that the optical path length difference between the object arm 28 and the reference arm 30 is greater. FIG. 4A depicts the direction the calculated modulation frequency is shifted as a result of the change in the recorded intensity modulation from FIG. 3A to FIG. 3B. Thus, the increased modulation frequency associated with the shift resolves that the test object surface 14 is located on the far side of the initial null position. For taking one or more subsequent measurements, the reference object 42 is preferably returned to the initial null position illustrated to maintain a preferred offset from the null condition and to provide a common reference for the subsequent measurements. The amount of the shift in the position of the reference object 42 is preferably calibrated or predetermined so that any measurements taken at the shifted position can also be related to the common frame of reference.

Figure 3C:
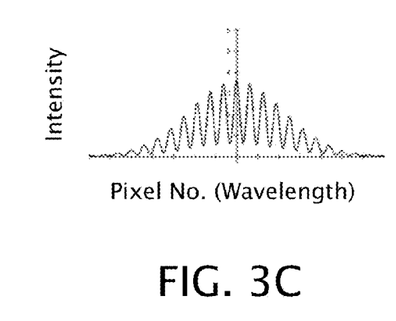
Figure 4B:
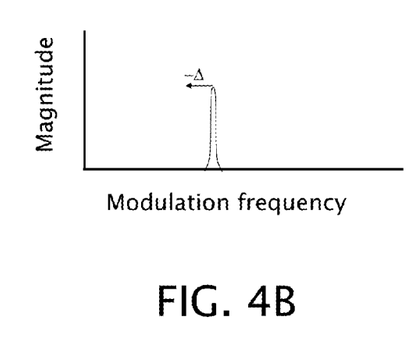

However, if the test object 12 were to be positioned as shown in dashed lines, where the test object surface 14 is located on the near side of the initial null condition, and the reference object is similarly shifted in the direction of arrow 60 for further shortening the optical path length of the reference arm 30, the optical path length difference between the object and reference arms 28 and 30 is decreased. FIG. 3C depicts a lower modulation frequency as would be recorded at the spectrometer 50 after a shift of the reference object 42 in the direction of arrow 60 for further shortening the optical path length of the reference arm 30 with respect to the object arm 28. The shift moves the instant null position towards the test object surface 14 so that the optical path length difference between the object arm 28 and the reference arm 30 is reduced. FIG. 4B depicts the direction the calculated modulation frequency is shifted as a result of the change in the recorded intensity modulation from FIG. 3A to FIG. 3C.

Thus, accompanying a reduction in the optical path length of the reference arm 30, a decrease in the calculated modulation frequency locates the test object surface 14 on the near side of the null position and an increase in the calculated modulation frequency locates the test object surface 14 on the far side of the null position. Of course, if the adjuster were set to increase the optical path length of the reference arm 30, then a decrease in the calculated modulation frequency would locate the test object surface 14 on the far side of the null position and an increase in the calculated modulation frequency would locate the test object surface 14 on the near side of the null position. Although FIG. 2 depicts the entire test object 12 on one side or the other of the null position, variations in the surface height of the test object surface 14 might locate different portions of the test object surface 14 on different sides of the null condition, which can be similarly detected.

While measurements known to be taken on the near side of null can be related to the common frame of reference, the measurements are preferably discarded and the interferometer is preferably readjusted to move the current or next measurement position to the far side of the null position. The readjustment is best accomplished by lengthening the optical path of the object arm.

Figure 5:
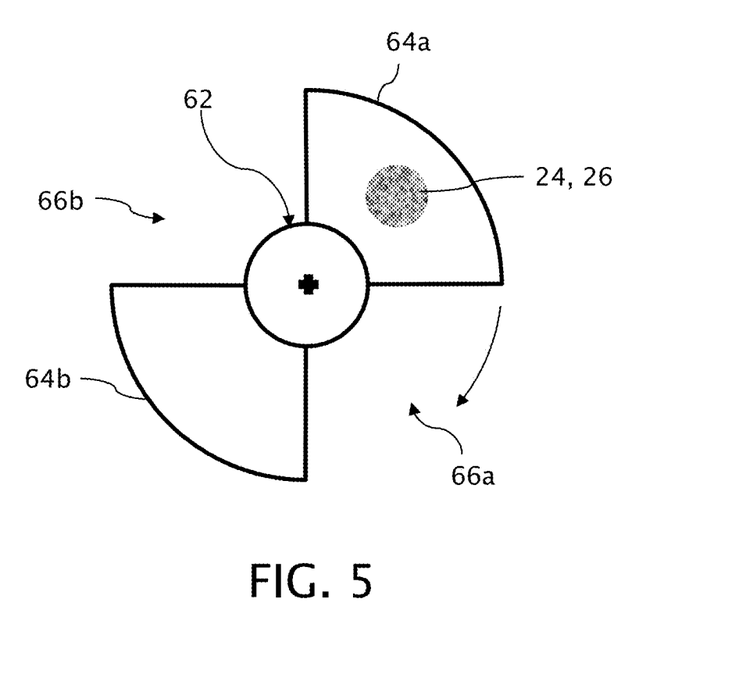
FIG. 5 is an axial view depicting the optical path length adjuster as a spinner.

Although the adjuster 46 is arranged for axially translating the reference object 42, comparable adjustments can be made to the optical path length of the reference arm 30 in a variety of other ways. In addition, since the measurement is of an optical path length difference (OPD), the adjustment can be made to either the test arm 28 or the reference arm 30. For example, as shown in FIG. 5, a spinner 62 made with two transmissive optic (e.g., glass or plastic) quadrants 64a and 64b separated by quadrants 66a and 66b of air (i.e., air gaps) can be inserted into the object arm 28 or the reference arm 30 to periodically interrupt the object beam 24 or the reference beam 26. The thickness of the optic quadrants 64a and 64b is set so the optical path length of either the object arm 28 or the reference arm 30 is periodically increased as a function of the refractive index difference between the optic quadrants 64a, 64b and the air quadrants 66a, 66b between them.

The spinner 62 can be indexed on command or rotated at a given rate in relation to the sampling of measurement positions across the test object surface 14 so that the shifts in optical path length can be monitored to detect the direction in which the modulation frequency changes as a result of the shifts. Since the amount of the shifts can be precisely known, the height values derived from the calculated modulation frequencies can be corrected for the shifts. In addition, the shifts can be monitored for changes in the direction of the modulation frequency associated with both increases and decreases in the optical path length of the affected arm 28 or 30 as the optic quadrants 64a and 64b move both into an out of engagement with the affected beam 24 or 26. More than one point can be sampled within each of the quadrants 64a, 64b and 66a, 66b, and changes in the direction of the modulation frequency monitored between adjacent points, where one of the adjacent points is measured through one of the air quadrants 66a or 66b and the other of the adjacent points is measured through one of the optic quadrants 64a or 64b.

The shifts between such adjacent points can be timed at fixed intervals between measured data points, such as a shift occurring at each of the 10th, 20th, 40th, etc. data points, depending, for example, on the expected variability of the test object surface 14. Instead of dividing the spinner 62 into quadrants, the spinner 62 can be divided into any number of different transmissive sections for changing the optical path length of the affected arm 28 or 30 between at least two different settings. The path length difference is preferably created by varying thickness or refractive index between the transmissive sections. In addition to a piezoelectric driver and a spinner, the optical path length adjuster can take a variety of other forms for physically or optically changing the optical path length difference between the object arm 28 and reference arm 30, including an electro-optic device such as an electro-optic modulator or retarder.

Figure 6:
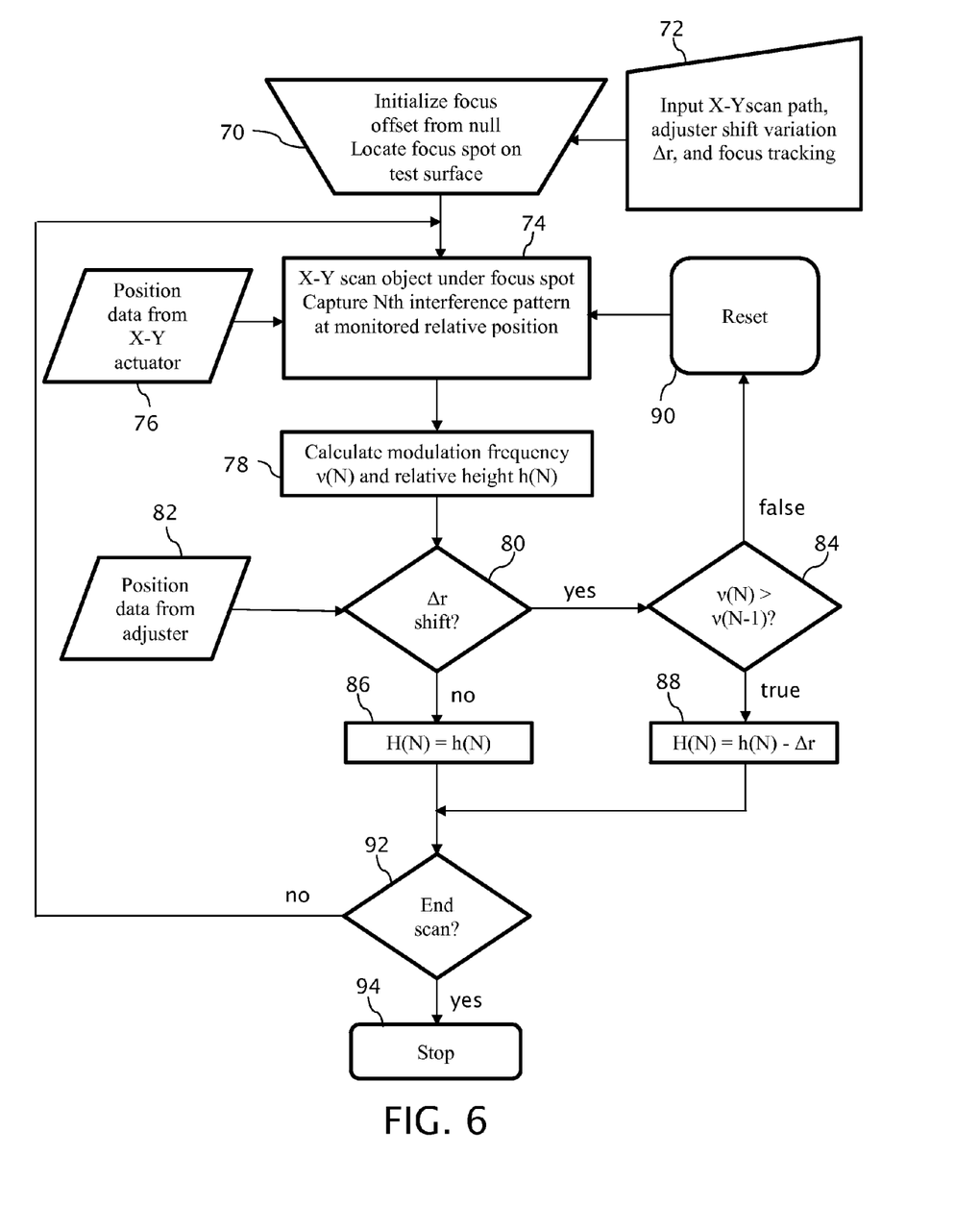
FIG. 6 is a flow chart depicting the operation of the profilometer in accordance with the invention.

A flow chart presented in FIG. 6 describes the operation of the optical profilometer 10 for accommodating measurement positions on opposite sides of a null condition with the adjuster 46 set to periodically shorten the optical path length of the reference arm 30 by the amount $\Delta r$. At step 70, the profilometer 10 is initially set up with the focal point of the focusing optic 32 set at a given offset on the far side of an initial null condition, and the test object 12 is positioned so that the focal point is located at a nominal point on the test object surface 14. Thus, the initial setup at step 70 establishes a nominal modulation frequency associated with the given offset. As a part of this initial setup, the x-y scan path is chosen and surface tracking (using z-axis actuator) is selected to be used or not used. The amount of adjustment $\Delta r$ is preferably set to be greater than the amount of expected height variation between adjacent points on the test object surface 14, and the frequency with which the adjustments through $\Delta r$ are made is preferably related to the likelihood that the test object surface 14 straddles the null position and to the number of measuring points within which such a determination should be made.

At step 74, the profilometer 10 together with its multi-axis stage 38 is preferably operated under the control of the processor 58 to perform a continuous scan of the test object surface 14 whereby the focus spot 34 is relatively moved across the test object surface 14. Data frames N from the spectrometer 50 are periodically captured at individual measurement positions of the focus spot 34 and referenced to position data input at step 76 from the multi-axis stage 38, which is responsible for effecting the scan. At step 78, the processor 58 calculates modulation frequencies $v(N)$ for each of the succession of focus spots 34 and converts the modulation frequencies $v(N)$ into relative height measurements $h(N)$ at the referenced positions of the scan across test object surface 14.

During the scan, the adjuster 46 also under the control of the processor 58 intermittently shifts the optical path length of the reference arm 30 through $\Delta r$. Based on position data concerning the adjuster 46 provided in step 82, decision step 80 determines if the reference arm 30 has been so shifted. If the determination is no, the height measurement $h(N)$ is recorded at step 86 as a final height measurement $H(N)$. If the determination is yes, the current modulation frequency $v(N)$ acquired at the shifted position is compared at step 84 to the modulation frequency $v(N-1)$ of the immediately preceding position to determine if the preceding measurement position remains on the far side of the null position. If true, i.e., the modulation frequency $v(N)$ is greater than the preceding modulation frequency $v(N-1)$, the final height measurement $H(N)$ is recorded at step 88 must be corrected by subtracting the adjuster shift $\Delta r$. The shift $\Delta r$ by the adjuster can be maintained or returned ($-\Delta r$) for the next data point or a later data point via control 82.

However, if the determination at step 84 is false, i.e., the modulation frequency $v(N)$ of the current measurement position is not greater than the modulation frequency $v(N-1)$ of the immediately preceding measurement position, the immediately preceding measurement position is determined to be on the wrong (near) side of the null position and the interferometer is reset at step 90 to a new null position by relatively lengthening the object arm 28. For example, the z axis actuator 36 can be used to restore the initial conditions of the measurement. After restoring the instant measuring position to the far side of null, the measurement scan can be continued or restarted from the beginning. If continued, the preceding measurement at $h(N-1)$, as well as any others captured before the interferometer is reset, is preferably discarded.

The main processing steps 74, 78, 80, 86 and 92, together with their supporting inputs at steps 76 and 82 and conditional processing steps 84, 88, and 90 for monitoring and accommodating measurements relative to the null position, proceed in sequence until the end of the sweep is determined at step 92 and the measurement cycle is stopped at step 94.

Monitoring for the direction of the modulation frequency change in response to the optical path length shifts of the adjuster 46 from a first setting to a second setting through $\Delta r$ can also be monitored for optical path length shifts of the adjuster 46 from the second setting to a first setting through minus $\Delta r$. The query of the determination step 84 is reversed for shifts in the opposite direction to "$v(N)<v(N-1)$?".

Intermittent or continuous adjustments of the x-y and z translation can be made to maintain succeeding measurements near the initial offset on the far side of the null position. Any such adjustments are preferably measured and recorded, such as by inputs at step 76, so that succeeding measurements can be related to a common frame of reference.

Those of skill in the art will appreciate that the invention as set forth in the claims can be embodied in a variety of configurations and related steps embracing the relationships and other teachings of the invention.

The invention claimed is:

1. An optical profilometer arranged for monitoring shifts in measurement positions between opposite sides of a null measurement position for measuring test object surfaces having an expected range of surface variation comprising:

a light source for emitting a beam composed of a band of wavelengths;

a spectrometer for measuring the spectrum of the beam;

an interferometer having object and reference arms along which object and reference portions of the beam from the light source are propagated into respective engagements with a test object surface and a reference surface en route to the spectrometer;

a focusing optic for focusing the object portion of the beam onto a focus spot on the test object surface;

an actuator for relatively moving the test object surface with respect to the focused spot through a range of positions offset from a null position at which optical path lengths of the object and reference arms are equal;

a processor in communication with the spectrometer for calculating a modulation frequency of the beam spectrum for measuring optical path length differences between the object and reference arms at a succession of different focus spot positions across the test object surface;

an optical path length adjuster for relatively shifting the optical path length of the reference arm with respect to the optical path length of the object arm at particular focus spot positions on the test object surface by an amount that exceeds the expected range of test object surface variation between adjacent focus spot positions; and the processor also providing for monitoring changes in the calculated modulation frequency associated with the relative shifts in optical path lengths imparted by the adjuster to detect changes in the position of the focus spots on the test object surface from one side of the null position to the other.

2. The profilometer of claim 1 in which the processor is arranged to interpret a monitored increase in the modulation frequency associated with the relative shift in the optical path length of the reference arm with respect to the optical path length of the object arm as a measurement position on one side of the null position and a monitored decrease in the modulation frequency associated with the relative shift in the optical path length of the reference arm with respect to the optical path length of the object arm as a measurement position on the other side of the null position.

3. The profilometer of claim 1 in which the processor relates the calculated modulation frequencies at the succession of different focus spot positions with variations in the height of points on the test object surface and adjusts the related height of the points in accordance with the relative shifts in optical path lengths effected by the adjuster.

4. The profilometer of claim 1 in which a z-axis actuator is arranged to restore the position of the subsequent focus spots on the test object surface from the other side to the one side of the null position in response to the detection of a change in the position of a particular focus spot position from the one side of the null position to the other.

5. The profilometer of claim 1 in which the adjuster is arranged to establish a first optical path length difference setting at which the test object surface is relatively moved with respect to the focused spot and to relatively shift the optical path length difference to a second setting at the particular focus spot positions on the test object surface to detect changes in the relative position of the focus spot positions from one side of the null position to the other.

6. The profilometer of claim 5 in which the adjuster is arranged to restore the first setting for subsequent focus spot positions on the test object surface.

7. The profilometer of claim 5 in which the adjuster is arranged to maintain the second setting for more than one subsequent focus spot positions on the test object surface before restoring the first setting, and the processor is arranged to monitor changes in the calculated modulation frequency associated with the relative shift in optical path length imparted by the adjuster from the second setting to the first setting to detect changes in the position of the focus spots on the test object surface from one side of the null position to the other.

8. The profilometer of claim 1 in which the adjuster is arranged to relatively shift the reference surface for changing the optical path length of the reference arm by the amount that exceeds the expected range of test object surface variation between adjacent focus spot positions.

9. The profilometer of claim 1 in which the adjuster is arranged to relatively change a refractive index within one of the object and reference arms so as to change the optical path length of one of the object and reference arms by the amount that exceeds the expected range of test object surface variation between adjacent focus spot positions.

10. The profilometer of claim 9 in which the adjuster includes a transmissive optic that interrupts the optical pathway of one of the test and reference arms and is movable between different positions for relatively shifting the optical path length of the reference arm with respect to the optical path length of the object arm between at least two different relative lengths.

11. A partial coherence interferometer for resolving signed spectral modulation frequency ambiguities of measured points on a test object comprising:

a spectrometer for measuring the spectral content of a beam containing a band of wavelengths centered about a nominal wavelength;

object and reference arms for conveying different portions of the beam into respective engagements with the test object and a reference object en route to the spectrometer;

an optical path length adjuster for relatively changing an optical path length of the reference arm with respect to an optical path length of the object arm by an amount that significantly exceeds the nominal wavelength of the band;

a processor in communication with the spectrometer for calculating modulation frequencies of the beam over the band of wavelengths and interpreting changes in the modulation frequency in response to the relative change in optical path length imparted by the adjuster to distinguish between optical path length differences at which the optical path length of the object arm is longer or shorter than the optical path length of the reference arm.

12. The interferometer of claim 11 in which the spectrometer provides for recording interference effects over the band of wavelengths between beam portions traversing the object and reference arms, and the processor calculates modulation frequencies imparted by the interference effects that are proportional to the absolute optical path length difference between the object and reference arms.

13. The interferometer of claim 12 in which the processor interprets a decrease in the modulation frequency in response to an increase in the optical path length of the reference arm imparted by the adjuster as an indication that the measurement was taken at a far side of the null condition at which the optical path length of the object arm is longer than the optical path length of the reference arm and an increase in the modulation frequency in response to a relative increase in the optical path length of the reference arm imparted by the adjuster as an indication that the measurement was taken at a near side of the null condition at which the optical path length of the object arm is shorter than the optical path length of the reference arm.

14. The interferometer of claim 12 in which the processor interprets decreases in the modulation frequency in response to the relative change in optical path length imparted by the adjuster as an indication that a measurement was taken at one side of a null position at which the optical path length difference is zero and increases in the modulation frequency in response to the relative change in optical path length imparted by the adjuster as an indication that a measurement was taken at the other side of the null position.

15. The interferometer of claim 12 in which the processor interprets a increase in the modulation frequency in response to a relative decrease in the optical path length of the reference arm imparted by the adjuster as an indication that the measurement was taken at a far side of the null condition at which the optical path length of the object arm is longer than the optical path length of the reference arm and an decrease in the modulation frequency in response to a relative decrease in the optical path length of the reference arm imparted by the adjuster as an indication that the measurement was taken at a near side of the null condition at which the optical path length of the object arm is shorter than the optical path length of the reference arm.

16. The interferometer of claim 11 in which the processor is arranged or receiving input concerning the expected range of variation between adjacent measured points on the test object, and the adjuster is controlled to relatively change the optical path length of the reference arm with respect to an optical path length of the object arm by an amount that is beyond the expected range of variation.

17. A method of monitoring shifts in measurement positions of a partial coherence interferometer between opposite sides of a null measurement position comprising steps of:
 directing a beam containing a band of wavelengths centered about a nominal wavelength along object and reference arms of the interferometer for conveying different object and reference portions of the beam into respective engagements with the test object surface and a reference object surface en route to a spectrometer for measuring a spectrum of the beam;
 focusing the object portion of the beam onto a focus spot on the test object surface;
 relatively moving the test object surface with respect to the focused spot through a range of positions offset from a null position at which optical path lengths of the object and reference arms are equal;
 calculating a modulation frequency of the beam spectrum for measuring optical path length differences between the object and reference arms at a succession of different focus spot positions across the test object surface;
 relatively changing an optical path length of the reference arm with respect to an optical path length of the object arm at particular focus spot positions on the test object surface by an amount that significantly exceeds the nominal wavelength of the band; and
 interpreting changes in the modulation frequency in response to the relative change in optical path length to distinguish between optical path length differences at which the optical path length of the object arm is longer or shorter than the optical path length of the reference arm.

18. The method of claim 17 including steps of
 relating the calculated modulation frequencies at the succession of different focus spot positions with variations in the height of points on the test object surface, and
 adjusting the related height of the points in accordance with the relative shifts in optical path lengths.

19. The method of claim 18 in which the step of calculating includes calculating the modulation frequencies based on interference effects over the band of wavelengths between beam portions traversing the object and reference arms, wherein the modulation frequencies based on the interference effects are proportional to the absolute optical path length difference between the object and reference arms.

20. The method of claim 17 including a step of establishing a first optical path length difference setting between the object and reference beams at which the test object surface is relatively moved with respect to the focus spot and the step of relatively changing includes relatively shifting the optical path length difference to a second setting at the particular focus spot positions on the test object surface to detect changes in the relative position of the focus spot positions from one side of the null position to the other.

21. The method of claim 20 including the step of maintaining the second setting for more than one subsequent focus spot positions on the test object surface before restoring the first setting, and the step of interpreting includes monitoring changes in the calculated modulation frequency associated with the relative shift in optical path length imparted by the adjuster from the second setting to the first setting to detect changes in the position of the focus spots on the test object surface from one side of the null position to the other.

22. The method of claim 20 including a step of relatively restoring the position of the subsequent focus spots on the test object surface from the other side to the one side of the null position in response to the detection of a change in the focus spot position from the one side of the null position to the other.

23. The method of claim 17 including a step of inputting information concerning the expected range of variation between adjacent measured points on the test object surface, and in which the step of relatively changing relatively shifts the reference surface with respect to the test object surface by the amount that exceeds the expected range of test object surface variation between adjacent focus spot positions.

24. The method of claim 17 in which the step of relatively changing includes relatively changing a refractive index within one of the object and reference arms so as to change the optical path length of one of the object and reference arms by the amount that exceeds the expected range of test object surface variation between adjacent focus spot positions.

25. The method of claim 17 in which the step of interpreting interprets decreases in the modulation frequency in response to the relative change in optical path length as an indication that a measurement was taken at one side of a null position and increases in the modulation frequency in response to the relative change in optical path length as an indication that a measurement was taken at the other side of the null position.

* * * * *